United States Patent Office 3,503,419
Patented Mar. 31, 1970

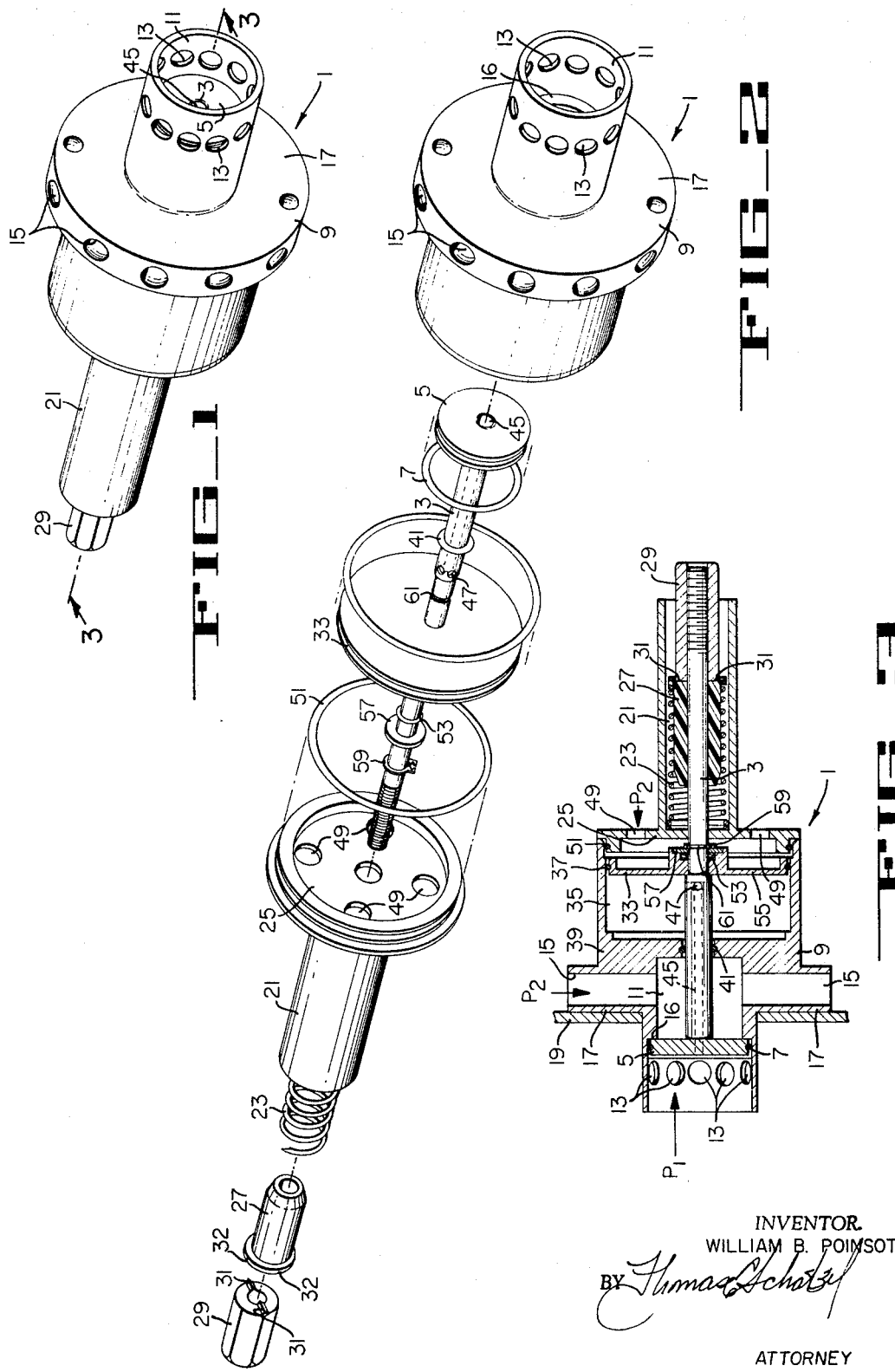

3,503,419
DIFFERENTIAL PRESSURE RELIEF VALVE
William B. Poinsot, Sherman Oaks, Calif., assignor to Ampex Corporation, Redwood City, Calif., a corporation of California
Filed Dec. 12, 1967, Ser. No. 689,834
Int. Cl. F16k 15/00, 31/12
U.S. Cl. 137—526
10 Claims

ABSTRACT OF THE DISCLOSURE

A differential pressure relief valve for maintaining a relatively constant pressure differential between two pneumatic pressure sources, e.g. an atmospheric source and a vacuum pump source. The valve includes a regulating piston subjected on one surface to one pressure source and on the other to the second pressure source. Intermediate the two sources is a bleeding means such that as the regulating piston travels due to a change in the pressure differential between the two sources, bleeding occurs neutralizing the change in the differential. The piston is under tension by a biasing means, the tension of which is preset according to the desired pressure differential. The biasing means prevents movement of the piston until the force of the preset tension is neutralized by the force of a countering pressure differential.

BACKGROUND OF THE INVENTION

The present invention pertains to a pneumatic differential relief valve for maintaining a constant pressure differential between two sources. Though those skilled in the art will readily recognize numerous applications, the valve has proven highly beneficial in association with the vacuum system of magnetic tape transports utilizing vacuum sources. Numerous tape transport designs incorporate vacuum columns in which tape loops are formed to maintain uniform tape tension over the record/playback heads and isolate the capstan from the supply and take-up reels. The columns generally extend to a vacuum source so that one tape surface is exposed to the pressure created by the vacuum source while the opposing tape surface is exposed to the column opening and atmospheric pressure. Thus, there is a pressure differential on opposing tape surfaces, the valve of which is significant in the tension on the tape intermediate the chambers about the capstan.

In various magnetic tape transport installations, for example airborne, shipborne, underwater and mobile applications, the transport is exposed to hostile environments. In such applications the differential pressure is prone to change. Atmospheric pressures and temperatures vary. Also, the electrical power levels vary such that the output of motors in vacuum pump assemblies vary. All of these factors tend to affect the pressure differential within the vacuum columns in turn affecting the tape tension.

Accordingly, it is desirable that the transport incorporate a means for maintaining a constant and accurate tape pressure differential notwithstanding the adverse factors. Heretofore, there were no known means to the inventor which satisfactorily and economically met with the high degree of reliable accuracy demanded by present technology.

SUMMARY OF THE INVENTION

The differential relief valve of the present invention maintains a substantially constant pressure differential between two sources though there are variations in the actual value of the pressure sources. These variations may be due to changes in altitude, temperature, power levels or other adverse factors. The valve includes a movable regulating piston within a cavity. The piston divides the cavity into two chambers. One chamber of the cavity and one exposed surface of the piston are subjected to one pressure source. The other chamber of the cavity and the other exposed surface of the piston are subjected to the other pressure source such that a pressure differential exits between opposing face surfaces of the regulating piston. The piston is simultaneously subjected to the force of a preset bias tension. The bias tension is preset in accordance with the desired pressure differential. For example, in tape transports, the bias tension may be preset in accordance with the desired tape tension. The valve further includes bleeding means. Accordingly, as the pressure differential deviates from the preset desired value, the piston moves adjacent the bleeding means providing a communication channel between the two sources to relieve the change in differential and maintain equilibrium between the bias tension and pressure differential forces acting on the piston.

BRIEF DESCRIPTION OF THE DRAWINGS

FIG. 1 is a perspective view of an assembled differential relief valve according to the present invention;
FIG. 2 is an exploded view of the valve of FIG. 1; and
FIG. 3 is a cross-sectional view in reverse orientation of the valve taken along the line 3—3 of FIG. 1.

DESCRIPTION OF THE PREFERRED EMBODIMENT

The drawings illustrate a pneumatic differential relief valve referred to by the general reference character 1 and incorporating the teachings of the present invention. The valve 1 includes a stem 3 extending longitudinally substantially end-to-end of the valve 1. On one end of the stem 3 is secured a regulating piston 5 in the shape of a disc with a resilient sealing O-ring 7 surrounding the outer peripheral surface. The stem 3 and the regulating piston 5 are supported within a housing 9 coaxially with a cyclindrical cavity 11. The longitudinal terminating end of the cavity 11 is open and serves as a channel means communicating between one chamber of the cavity 11 and a first pressure source exerting a pressure $P_1$ on one surface of the regulating piston 5. For example, in a magnetic tape transport the first pressure source $P_1$ may be a plenum chamber associated with a vacuum pump assembly (not shown). The pump assembly may be designed to remove air from the plenum chamber and create a substantial vacuum such that one surface of the tape within the vacuum source is subjected to a pressure lower than the atmospheric pressure. The cavity 11 carries a bleeding means in the form of a plurality of evenly spaced apertures 13 about the outer peripheral surface. It may be noted, that as the stem 3 is moved longitudinally, the piston 5 moves simultaneously within the cavity 11 and the sealing O-ring 7 moves across the bleeding apertures 13.

Within the housing 9 and the cavity 11 is a second channel means in the form of a plurality of evenly spaced apertures 15 extending radially from the second chamber of the cavity 11 and communicating with a second pressure source $P_2$. The cavity 11 further includes an internal ledge 16 which serves as a stopping means for the piston 5 and thereby limiting the longitudinal travel of the piston 5 intermediate the two channel means. In magnetic tape transport applications, the channel means 15 communicates to the atmospheric pressure the same as the surface of the tape loop facing the opening of the vaccum chambers. The valve 1 includes a mounting ledge 17 which is illustrated in FIG. 3 as engaging a partitioning wall 19. The wall 19 may be adapted to separate and seal the plenum chamber of the associated vacuum pump assembly from the atmospheric source. Accordingly, the regulating piston 5 has a pressure $P_2$ acting on the surface area opposite the surface area exposed to the pressure $P_1$. When applied in magnetic tape transports this pressure differential ($P_2$–$P_1$) is the same as the differential on opposing tape surfaces within the vacuum chambers.

The opposite longitudinal end of the stem 3 extends in and through a spring chamber 21 where the stem engages and is urged by a biasing means. The biasing means is illustrated in the form of a coil spring 23 supported at one end by a stationary retaining wall 25 and at the other end by nylon spring guide 27 movable longitudinally within the chamber 21. The stem 3 has threads on one longitudinal end and a hexagonal internally threaded knob 29 simultaneously engages the threads of the stem 3 and the guide 27. The knob 29 is longitudinally adjustable and depending on the desired differential pressure, the knob 29 is so adjusted thereby presetting the tension of the spring 23. The tension of the spring 23 forces the piston 5 against the internal ledge 16 until the force produced on the tension 5 by the differential pressure $P_2$–$P_1$ exceeds the preset spring tension. When the force produced by the differential pressure $P_2$–$P_1$ exceeds the preset spring tension value the regulating piston 5 is urged adjacent the apertures 13. The apertures 13 allow bleeding between the pressure sources $P_1$ and $P_2$ until the force of the differential equals that of the preset tension. The degree of bleeding is dependent upon the size of the communication opening allowed by the O-ring 7. Consequently, by adjusting the knobs 29 the differential between $P_1$ and $P_2$ is adjusted and then maintained. It may be further noted that the knob 29 carries bosses 31 engaging slots 32 in the end of the guide 27. This in turn produces a ratchet action with the knob 29 thereby aiding in maintaining the preset adjustment without deviations which may otherwise result in adverse environments where the valve 1 is exposed to severe vibrations.

Intermediate the cavity 11 and the retaining wall 25 is a booster piston 33 within a buffer chamber 35. The booster piston carries a sealing O-ring 37 about its outer periphery to seal and isolate the pressure sources acting on opposite surfaces of booster piston 33. The buffer chamber 35 is isolated from the cavity 11 by an isolating wall 29 and a sealing O-ring 41 surrounding the stem 3.

The stem 3 carries a longitudinal axial channel 45 communicating between the pressure source $P_1$ and the buffer chamber 35. There are four laterally spaced capillary holes 47 extending from the axial channel 45 to the buffer chamber. Thus, one surface of the booster piston 33 is exposed to the pressure source $P_1$. The other side of the booster piston 33 is subjected to the pressure source $P_2$ through a plurality of spaced apertures 49 communicating between the pressure source $P_2$ and the buffer chamber 35. The apertures 49 are illustrated herein as four in number and spaced ninety (90) degrees apart. Completing the valve assembly 1, there is an O-ring 51 which serves as a means for securing the retaining wall 25 with the buffer chamber 35. There is also illustrated an O-ring 53 and a support washer 57 held in place by a lock ring 59 setting within a slot 61 all of which in combination secure the booster piston 33 to the stem 3.

The buffer chamber 35 and booster piston 33 arrangement provides a means for retarding oscillation or vibrations in the stem motion upon a change in pressure differential between the sources $P_1$ and $P_2$. When the pressure differential is at a steady state value in accordance with the preset spring tension value, the regulating piston 5 and booster piston 33 are both subjected to the same pressure differential. It may be noted that any bleeding through the bleeding holes 15 is reflected to the buffer chamber 35 through the axial channel 45 and capillary holes 47. Upon a change in the pressure differential, due either to a change in $P_1$ or $P_2$, there is a change in net pressure exerted on the regulating piston 5 and movement in the stem 3. There is simultaneous movement in the booster piston 33. The total movement depends upon the value of change in the pressure differential and the amount of bleeding through the apertures 15 necessary to equalize the pressure differential with the preset spring tension. Though the booster piston 33 movement is simultaneous with the regulating piston 5, there is a time delay before the pressure differential on opposing surfaces of the booster piston equals that on the regulating piston. This is due to a delay in communicating the new pressure $P_1$ through the axial channel 45 and capillary holes 47. Accordingly, since the booster piston 33 is initially subjected to a different pressure than that of the regulating piston 5, it tends to retard oscillatory movement of the stem 3. Due to the nature of the arrangement, regardless of whether the pressure differential increases or decreases with respect to the preset tension, the buffering effect counters oscillations.

I claim:

1. A differential pressure relief valve comprising, in combination:

a housing including a cavity;

first channel means adapted for communicating between said cavity and a first pressure source;

second channel means adapted for communicating between said cavity and a second pressure source;

bleeding means intermediate the first and second channel means for providing access between the cavity and at least one of said pressure sources;

a first piston supported within said cavity, the piston dividing the cavity into a first chamber and a second chamber and movable past the bleeding means;

biasing means urging said piston, the biasing means creating a force on the piston coinciding with that of a desired pressure differential between said first and second sources, whereby the relationship of the forces of the pressure differential and biasing means controls the motion of the piston in positional relationship to the bleeding means to allow bleeding between said first and second chamber and equalize the force of the pressure differential with the force of the biasing means;

a stem member joining said piston and extending externally to said cavity, the stem member movable longitudinally with relationship to said cavity;

a buffer chamber within said housing and isolated from said cavity, the buffer chamber including third channel means adapted for communicating between the buffer chamber and said second pressure source;

a booster piston secured to the stem member within the buffer chamber and movable longitudinally within the buffer chamber responsive to stem movement, one surface of the booster piston being exposed to the pressure of the third channel means and the other surface of the booster piston being pneumatically sealed from said one surface; and a communicating channel within the stem opening within the first chamber and within the buffer chamber adjacent the other surface of the booster piston.

2. The pressure differential valve of claim 1 in which:

the cavity is of substantially circular cross-sectional configuration one longitudinal terminating end of which is substantially adjacent the first channel means; and the piston includes a circular disc member coaxial with the cavity and adapted to provide a substantial air seal between said first and second channel means.

3. The pressure differential valve of claim 2 in which the bleeding means includes a plurality of spaced apertures within the outer wall of the cavity.

4. The differential pressure relief valve of claim 3 further including:

stop means for limiting the longitudinal travel of the piston within said cavity intermediate the first and second chambers, and in which the second channel means includes a plurality of spaced apertures about the outer walls of the cavity within the second chamber.

5. The differential pressure relief valve of claim 1 in which the biasing means provides an adjustable bias tension which may be preset.

6. The differential pressure relief valve of claim 5 in which the biasing means includes locking means locking said biasing means in place once the preselected value is preset.

7. The differential pressure relief valve of claim 5 further including a stem member joining said piston and extending externally to said cavity, the stem member movable longitudinally with relationship to said cavity, and in which said biasing means is positioned external to said cavity and acts on said stem member.

8. The differential pressure valve of claim 1 in which the communicating channel includes an axial bore opening within the buffer chamber through plurality of port means within the stem communicating with channel and the buffer chamber.

9. A pressure differential relief valve for maintaining a relatively constant pressure differential on a tape loop within a vacuum chamber of a magnetic tape transport comprising in combination:

a housing including a cavity, the exterior of the housing being subject to a first pneumatic pressure source coinciding with the pressure on one tape surface within a vacuum chamber;

a first channel means communicating between the cavity and a second pneumatic pressure source coinciding with the pressure on the other tape surface within the vacuum chamber;

a second channel means communicating between the first cavity and the exterior of the housing;

bleeding means intermediate the first and second channel means for providing access between the cavity and the first and second pressure sources;

a piston supported within said cavity, the piston dividing the cavity into a first and second chamber, said piston being movable within the cavity past the bleeding means, the position of the piston in relationship to the bleeding means controlling the degree of pressure bleeding between said first and second chambers;

biasing means urging the piston in said cavity, and creating a preselected tension on the piston coinciding with the desired pneumatic pressure differential on the tape within a vacuum chamber;

a stem member jonining said piston and extending externally to said cavity, the stem member movable longitudinally with relationship to said cavity;

a buffer chamber within said housing and isolated from said cavity, the buffer chamber including third channel means adapted for communicating between the buffer chamber and said second pressure source;

a booster piston secured to the stem member within the buffer chamber and movable longitudinally within the buffer chamber responsive to stem movement, one surface of the booster piston being exposed to the pressure of the third channel means and the other surface of the booster piston being pneumatically sealed from said one surface; and a communicating channel within the stem opening within the first chamber and within the buffer chamber adjacent the other surface of the booster piston;

whereby as the pressure differential between the first and second sources tend to vary, the positional relationship of the piston and the bleeding means is automatically adjusted to maintain equilibrium between the preselected tension and the pressure differential of the two sources.

10. The differential pressure valve of claim 9 in which the first channel means communicates between the cavity and a second pneumatic source coinciding with the atmospheric pressure.

References Cited

UNITED STATES PATENTS

| 991,671 | 5/1911 | Thurman | 137—526 |
|---|---|---|---|
| 2,481,018 | 9/1949 | Johnson | 137—526 |
| 2,282,909 | 5/1942 | Thiersch | 242—56.4 XR |
| 3,229,953 | 1/1966 | Muir | 137—494 |

WILLIAM F. O'DEA, Primary Examiner

WILLIAM H. WRIGHT, Assistant Examiner

U.S. Cl. X.R.

137—494; 251—48